Oct. 15, 1968  C. G. SAMARTZOPOULOS  3,405,548
APPARATUS AND METHOD FOR ANALYSING LIQUID SPRAYS
Filed Jan. 18, 1966  3 Sheets-Sheet 1

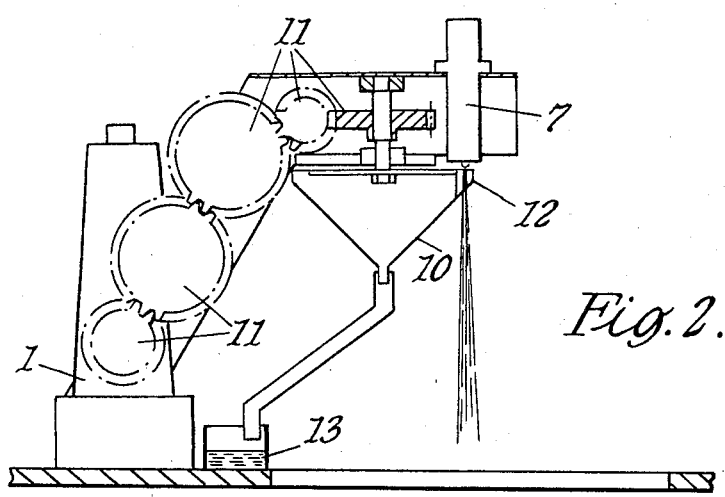
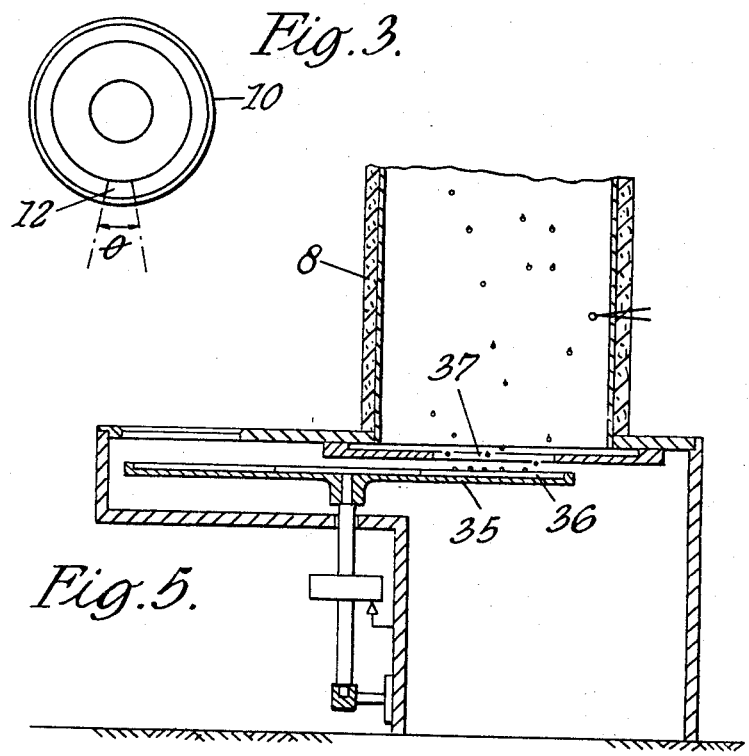

United States Patent Office 3,405,548
Patented Oct. 15, 1968

3,405,548
APPARATUS AND METHOD FOR ANALYSING
LIQUID SPRAYS
Costas George Samartzopoulos, 9 Hillside Court,
Harvey Road, Guildford, Surrey, England
Filed Jan. 18, 1966, Ser. No. 521,285
Claims priority, application Great Britain, Jan. 19, 1965,
2,260/65
5 Claims. (Cl. 73—1)

ABSTRACT OF THE DISCLOSURE

Apparatus and method for analysing a liquid spray which includes introducing into the top of the tower the liquid spray for a relatively short period of time, and recording the rate of accumulation of the weight of the drops reaching the bottom of the tower, the tower being relatively high so that the effect of the drops falling initially at less than their terminal velocities may be neglected, calibration being effected by introducing into the tower a spray of molten wax having the same physical characteristics as the liquid.

Figure 1:
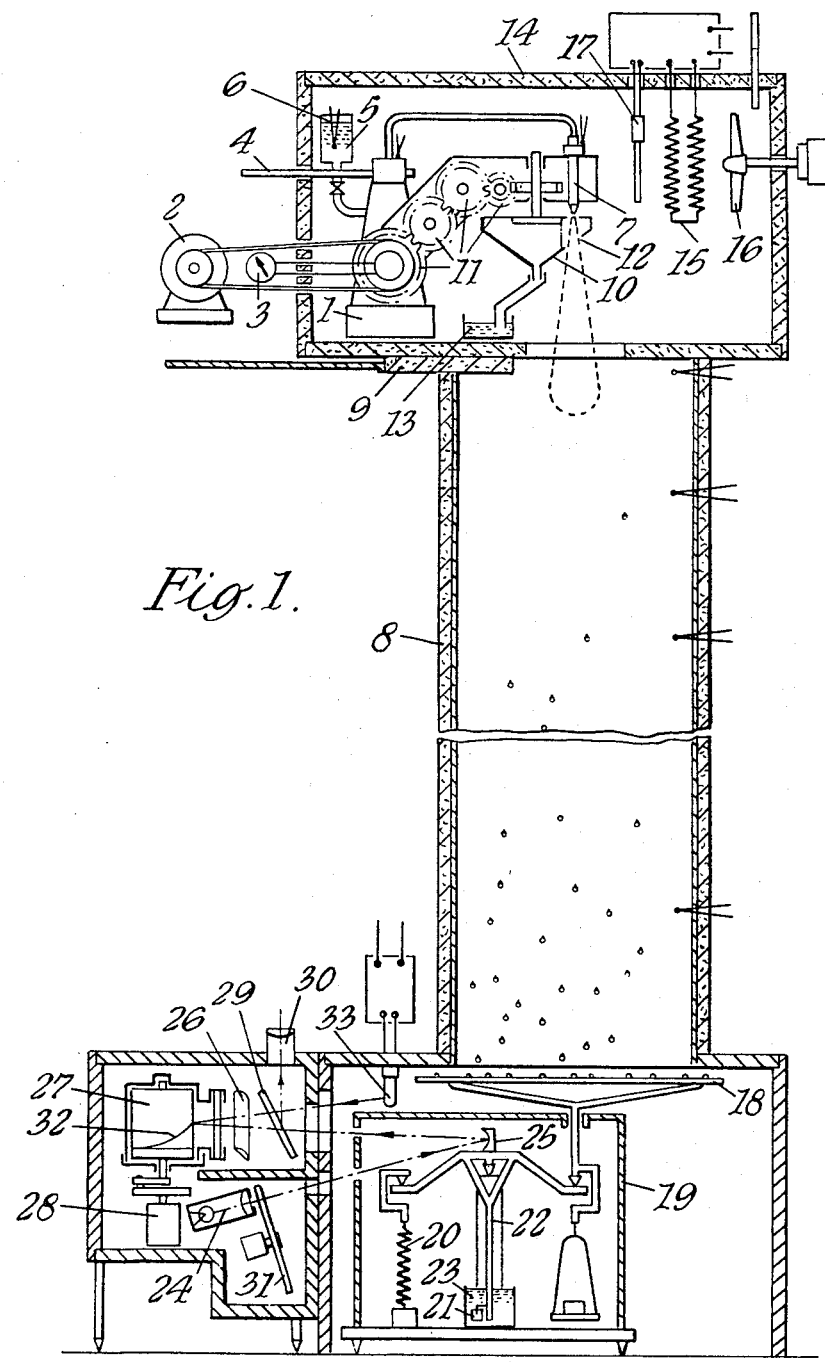

This invention relates to apparatus and method for analysing liquid sprays, that is to say determining the size and distribution of drops in a liquid spray, where the drops have diameters ranging between 5 and 250 microns.

One purpose to which the apparatus and method according to the present invention may be put is the study of the performance of various nozzles used to create the liquid spray, and, in particular, the study of the performance of various types of injection nozzles used in diesel engines.

The present invention consists in apparatus for analysing a liquid spray, which includes an enclosed tower, means for introducing into the top of the tower the liquid spray for a relatively short period of time, and means for registering or recording the rate of accumulation of the weight of the drops reaching the bottom of the tower, the tower being relatively high so that the effect of the drops falling initially at less than their terminal velocities may be neglected.

The invention further consists in a method for analysing a liquid spray, which includes introducing into the top of a tower the liquid spray for a relatively short period of time and registering or recording the rate of accumulation of the weight of the drops reaching the bottom of the tower, the tower being relatively high so that the effect of the drops falling initially at less than their terminal velocities may be neglected.

The invention still further consists in a method as set forth in the preceding paragraph, which includes the further steps of introducing into the tower a spray of a molten wax having the same physical characteristics as the liquid, measuring at certain intervals of time the diameters of the solidified wax drops reaching the bottom of the tower and thus establishing the relationship between drop size and time taken to reach the bottom of the tower, and thereafter transforming the time taken for liquid drops to reach the bottom of the tower into liquid drop sizes to derive the relationship between liquid drop sizes and accumulated weight of the drops.

Figure 4:
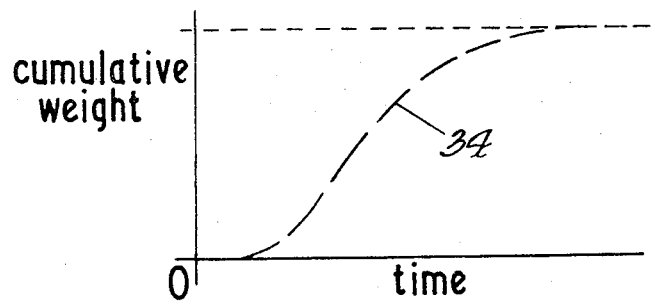
Figure 6:
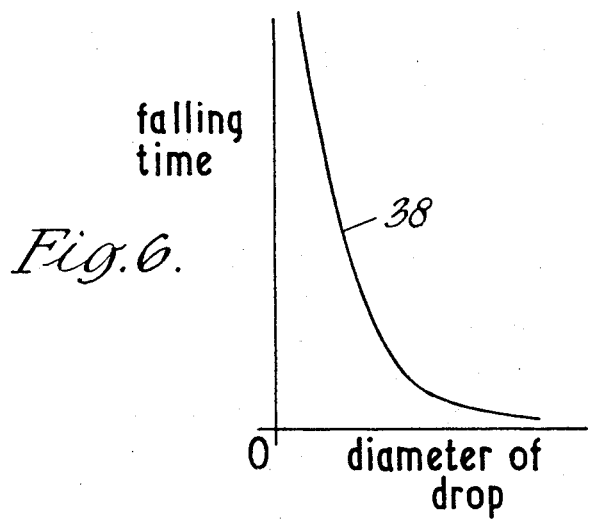
Figure 7:
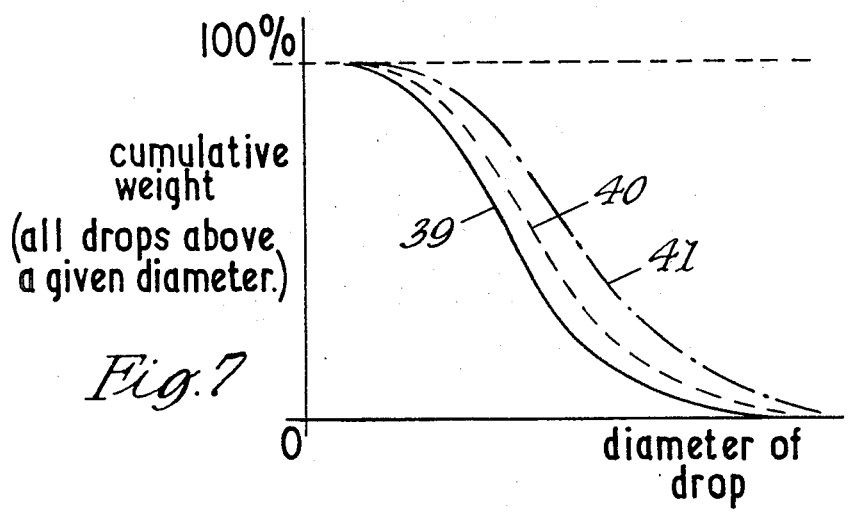

In the drawings accompanying the provisional specification:

FIGURE 1 is a diagrammatic view of apparatus according to the present invention, FIGURE 2 shows a detail of FIGURE 1 on a larger scale, FIGURE 3 shows a detail of FIGURE 2, FIGURE 4 shows a curve obtained with the apparatus of FIGURE 1, FIGURE 5 shows a portion of FIGURE 1 modified for calibration purposes, FIGURE 6 shows a curve obtained with the apparatus of FIGURE 5, and FIGURE 7 shows a curve obtained from the curves of FIGURES 4 and 6.

In carrying the invention into effect according to one convenient mode by way of example, FIGURE 1 shows apparatus for determining the size and distribution of drops in a liquid spray.

The apparatus includes an injection pump 1 driven by a variable speed motor 2 and having a revolution counter 3 and a control rack 4 for adjusting the rate of flow of liquid from the pump 1. Liquid is supplied to the pump 1 from tank 5 whose temperature is monitored by thermocouple 6.

The pump 1 supplies liquid to an injection nozzle 7 arranged to direct a spray of liquid into a tower 8 through an opened door 9.

In order to direct the spray into the tower 8 for only a relatively short period of time (say 1 sec.), so as to prevent coagulation of the drops as they fall through the tower 8, in the form of a "burst" of a relatively small number of sprays from the nozzle 7, a rotating shutter 10 is arranged adjacent the outlet of the nozzle 7.

The shutter 10 is driven from the driving shaft of the pump 1 by a train of gears 11 reducing the rotational speed of the shutter 10 to $1/72$ of that of the pump shaft so that during one revolution of the shutter 10 the nozzle 7 will produce 72 sprays. The shutter 10 has a cut-away portion 12 or radial angle $\theta$, the remainder of the shutter serving as a hopper to catch the spray from the nozzle and direct it into a receptacle 13. Where it is desired that each burst shall contain only N sprays from the nozzle 7, then $\theta$ is made equal to $360° \times (N/72)$. It is preferred that N should be not more than 10 and the total injection time not more than 2 secs.

The pump 1, nozzle 7, and associated apparatus described above are all enclosed in a box 14 provided with a heater 15, a fan 16 and a temperature regulator 17 arranged to keep the temperature within the box 14 constant to within $\pm 1°$ C.

The effective height of the tower 8 is sufficiently great (say about 6 metres) that the time taken by the drops to reach their terminal velocities when falling down the tower is relatively small when compared with the total time taken by the drops to fall so that the drops may be assumed to fall down the tower at their critical velocities.

At the bottom of the tower the drops of liquid are collected by a dish 18 which is large enough to catch all of the drops. The dish 18 is connected to a chemical balance 19 modified by the inclusion of a spring 20 to counterbalance the dead weight of the moving system and a plate 21 fixed to the needle 22 of the balance and immersed in a silicone oil bath 23 which serves to damp the movement of the system. The various characteristics are selected so that critical damping is achieved.

The tower 8 and the balance 19 are totally enclosed and maintained at a constant temperature in order to minimise air currents.

The weight of the drops accumulated upon the dish 18 is recorded by means of an optical system which includes a light source 24, a concave mirror 25 secured to the weighing beam of the balance 19, a lens 26, and light sensitive recording paper 27 wound on a drum driven by a motor 28. A viewing system is also provided by a glass plate 29 and eyepiece 30, and a rotating shutter 31 imposes time marks at 5 sec. intervals on the trace 32 on the paper 27.

In operation, the start of a "burst" is indicated on the paper 27 by means of a flash lamp 33 operated in synchronism with the arrival of the cut-away portion 12 of the shutter 10 at the nozzle 7, and thereafter the cumulative weight of the drops falling upon the dish 18 is recorded upon the paper 27.

A typical curve obtained on this way is shown as 34 in FIGURE 4, the breaks in the curve representing 5 second intervals as determined by shutter 31.

It is then necessary to obtain the relationship between the time taken for a drop to fall to the dish 18 and its diameter. This is achieved by means of a calibration experiment in which the apparatus of FIGURE 1 is modified in the manner shown in FIGURE 5.

In this modified apparatus, the balance 19 and associated apparatus is replaced by a disc 35 which can be rotated by hand from outside the tower. On the disc are placed a number of circumferentially spaced glass plates 36 and a narrow radial slit 37 is fixed to the bottom of the tower 8.

The calibration experiment is carried out by injecting from the nozzle 7 a selected wax having its density, surface tension and viscosity equal to those values of the liquid to be sprayed.

As they fall through the tower 8, the drops of wax solidify and pass through the slit 37 to be collected on one of the plates 36, the disc 35 being rotated intermittently.

As the diameter of the solidified wax spheres which pass through the narrow slit in a short interval of time can be considered nearly uniform, their diameters may be measured from photomicrographs and thus a curve 38 as shown in FIGURE 6 can be plotted for the relationship between the diameter of a drop of wax and the time it takes for it to fall down the tower 8.

Due to the similarity of their physical characteristics, it can be assumed that a drop of the chosen wax will fall in the same time as a drop of the same size of the liquid under test.

This being so, then the curve 34 of FIGURE 4 may be combined with the curve 38 of FIGURE 6 to produce a curve 39 (FIGURE 7) showing the relationship between the diameter of a drop and the cumulative weight expressed as the percentage weight of all the drops exceeding any given diameter.

This curve 39 thus gives full information of the distribution of drop diameters in the liquid spray. Curves 40 and 41 represent other distributions as may be obtained, for example, with different nozzles for the same liquid, or with different liquids for the same nozzle, although in this latter case it will be appreciated that several calibration experiments will have to be carried out using different waxes corresponding to the different liquids.

Using the method and apparatus described above, it has been found that the distribution of size of drops in sprays fit well a chi-squared distribution function, the constants of which for various nozzles can be determined.

Various modifications may be made within the scope of the present invention.

I claim:
1. Apparatus for analysing a liquid spray, which includes an enclosed tower, means for introducing into the top of the tower the liquid spray for a relatively short period of time, said introducing means including a pump for supplying liquid to a nozzle, and a rotatable shutter having a cut-away portion, the shutter being positioned beneath the nozzle so that the spray from the nozzle is permitted to enter the tower in a burst only each time the cut-away portion passes beneath the nozzle, and means for registering the rate of accumulation of the weight of the drops reaching the bottom of the tower, the tower being relatively high so that the effect of the drops falling initially at less than their terminal velocities may be neglected.

2. Apparatus as claimed in claim 1, which includes means for feeding to the registering means a reference signal to indicate the beginning of the burst 3. Apparatus as claimed in claim 1, wherein means are provided for temporarily modifying the apparatus for calibration purposes, said means including a rotatable disc and a radial slit locatable at the bottom of the tower so that the disc will collect only drops passing through the slit.

4. A method for analysing a liquid spray, which includes introducing into the top of a tower the liquid spray for a relatively short period of time, and recording the rate of accumulation of the weight of the drops reaching the bottom of the tower, the tower being relatively high so that the effect of the drops falling initially at less than their terminal velocities may be neglected, calibration being effected by introducing into the tower a spray of molten wax having the same physical characteristics as the liquid, measuring at certain intervals of time the diameters of the solidified wax drops reaching the bottom of the tower and thus establishing the relationship between drop size and time taken to reach the bottom of the tower, and thereafter transforming the time taken for liquid drops to reach the bottom of the tower into liquid drop sizes to derive the relationship between liquid drop sizes and accumulated weight of the drops.

5. A method as claimed in claim 4, wherein at the end of each interval of time the solidified wax drops are allowed to pass through a slit and collect upon a rotatable disc, the diameter of the drops being then measured.

References Cited

UNITED STATES PATENTS

| 2,597,899 | 5/1952 | Payne | 73—432 |
| 3,246,509 | 4/1966 | Hauk | 73—119 |

DAVID SCHONBERG, *Primary Examiner.*

S. CLEMENT SWISHER, *Assistant Examiner.*